FIG_3_

FIG_4_

INVENTOR.
Clarence L. Best
BY
White, Prost, Hehn & Lothrop
ATTORNEYS.

FIG_6_

FIG_7_

Jan. 9, 1934.  C. L. BEST  1,942,637
TRACTOR CONTROL
Filed June 2, 1930  7 Sheets-Sheet 6

Jan. 9, 1934.     C. L. BEST     1,942,637
TRACTOR CONTROL
Filed June 2, 1930     7 Sheets-Sheet 7

FIG_9_

FIG_10_

INVENTOR.
Clarence L. Best
BY
White, Prost, Flehr & Lothrop
ATTORNEYS.

Patented Jan. 9, 1934

1,942,637

UNITED STATES PATENT OFFICE 1,942,637

TRACTOR CONTROL

Clarence Leo Best, San Leandro, Calif., assignor to Caterpillar Tractor Co., San Leandro, Calif., a corporation of California Application June 2, 1930. Serial No. 458,957

20 Claims. (Cl. 180—14)

My invention relates to the control of vehicles primarily used for draft purposes and is especially concerned with the driving effectiveness of a draft vehicle when operating to advance a drawn vehicle.

An object of my invention is to improve the tractive effectiveness of a draft vehicle operating with a drawn vehicle.

Another object of my invention is to provide means for automatically varying the transmission ratio between the source of power on a draft vehicle and the ground engaging members of a draft vehicle to improve the effectiveness of the vehicle upon a drawn load.

The foregoing and other objects are attained in the embodiment of the invention shown in the drawings, in which.

In its preferred form, the tractor control of my invention comprises a draft vehicle provided with a source of power and ground engaging members and with means for varying the ratio of power transmission from the source of power to the ground engaging members together with a drawn vehicle and mechanism responsive to the effort required to draw the drawn vehicle for establishing the transmission ratio between the source of power and the ground engaging members on the tractor.

Although the tractor control of my invention is susceptible of wide variation in accordance with the circumstances under which it is used, I have chosen to describe it herein as it is embodied on a tractor of the usual type employed in drawing a dump wagon. As particularly shown in Figs. 1 to 4, inclusive, I have provided a tractor generally designated 5. This machine preferably includes a source of power 6, such as a gasoline engine, and is further provided with ground engaging members such as the tracks 7 mounted at either side of the tractor body 8. There is the customary control mechanism employed in conjunction with the tractor and there is also included mechanism interposed between the source of power 6 and the ground engaging member 7 to vary the ratio of power transmission between the engine and the ground engaging member.

The ratio varying mechanism is of any suitable sort and may inculde a friction disc transmission, a hydraulic transmission, or an electric transmission of any of the customary forms familiar to those skilled in the art and unnecessary of detailed description herein. Suffice it to say that such a ratio varying mechanism is employed between the engine 6 and the ground engaging member 7 and is controlled by means of a lever 9 which is movable about an axis 11. Coupled to the tractor 5 by a draw bar generally designated 12 is a drawn vehicle 13. In the present instance, this vehicle is illustrated as a dump wagon having a body 14 supported on a framework 16 in turn resting on ground engaging members 17 such as track-type trucks.

In accordance with my invention I provide intermediate the tractor 5 and the drawn vehicle 13 a draft connection which is mutable or substantially movable in accordance with the draw bar pull exerted by the tractor 5 on the trailer or drawn vehicle 13. As especially illustrated in Fig. 2, at the rear portion of the tractor I mount a pair of brackets 18 and 19 which not only are secured to the tractor body but also are fastened to a generally horizontal plate 21. Parallel with the plate 21 I provide a second plate 22 which is spaced from the plate 21 by spacers 23 and 24 and is further supported by brackets 26 and 27 extending to the tractor body.

Figure 1:
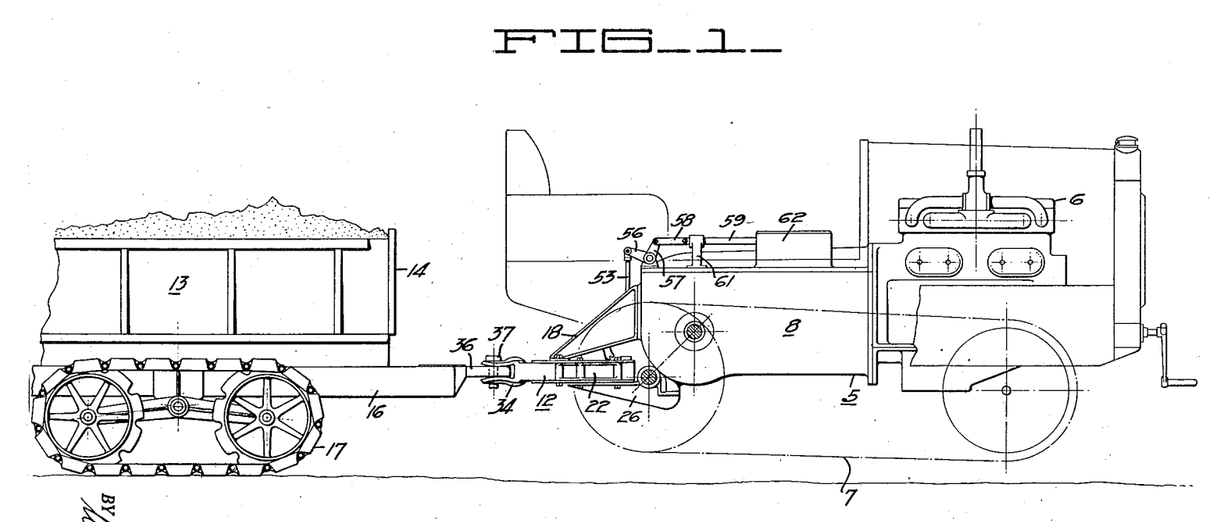
Fig. 1 is a side elevation of a tractor coupled to a drawn vehicle and provided with a tractor control in accordance with my invention.
Figure 2:
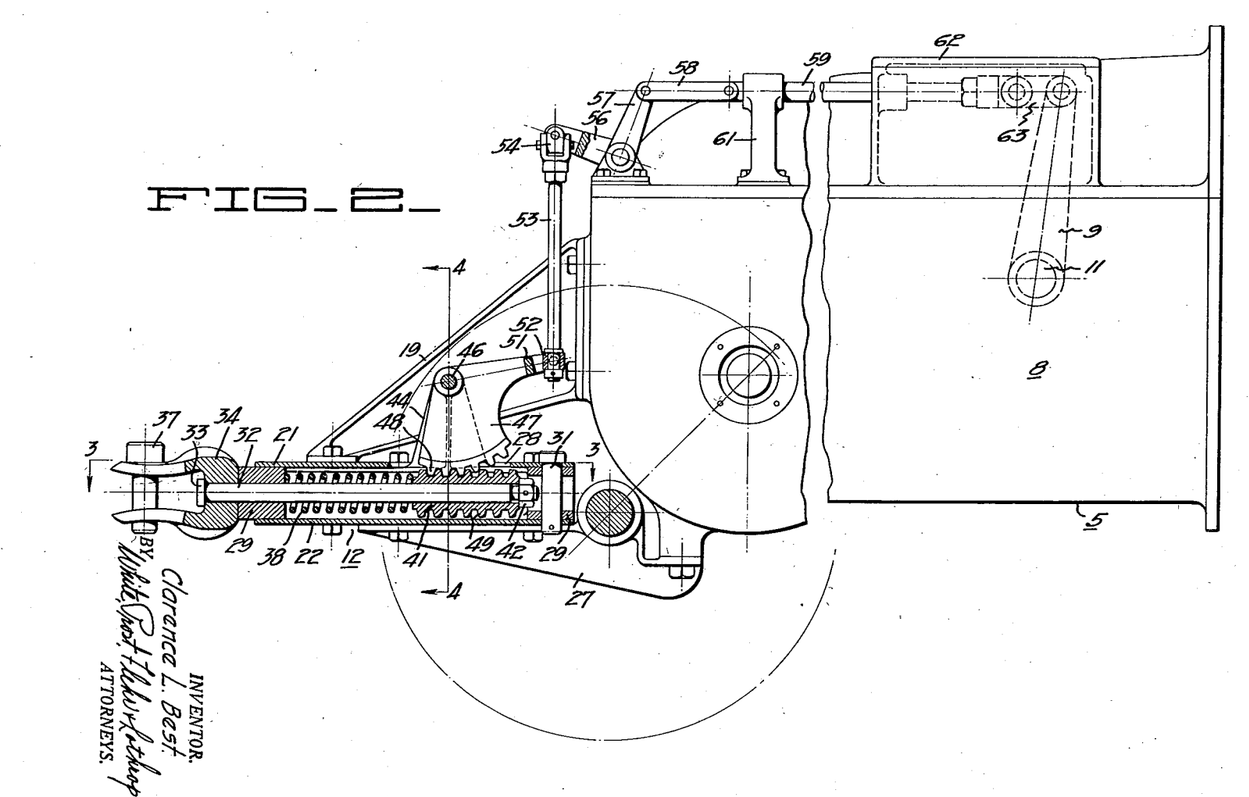
Fig. 2 is an enlarged detail of the tractor shown in Fig. 1 portions being in cross section on a vertical longitudinal plane.
Figure 3:
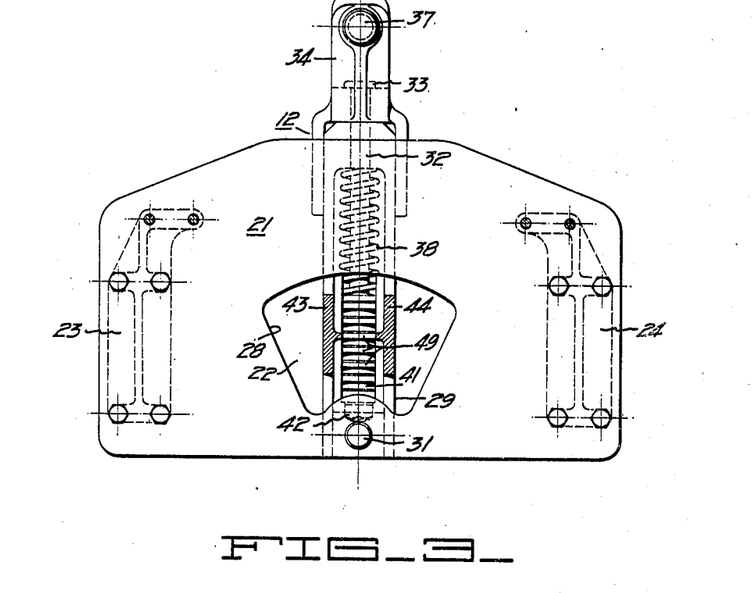
Fig. 3 is a cross section on the line 3—3 of Fig. 2.
Figure 4:
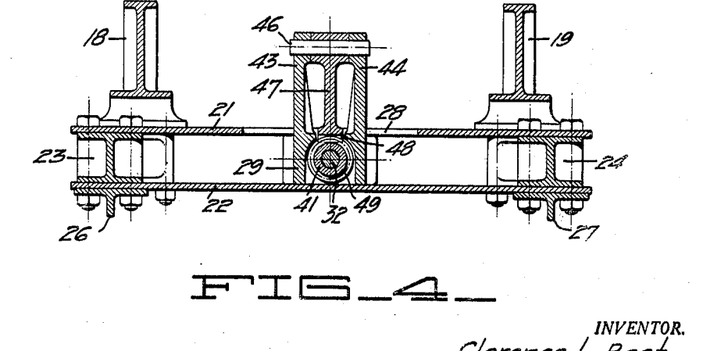
Fig. 4 is a cross section on the line 4—4 of Fig. 2.

Disposed between the plates 21 and 22 and projecting through an aperture 28 in the upper plate 21 is a casing 29 hollow in its central portion and partially closed at its ends. Passing through one of the ends of the casing 29 is a pivot pin 31 which also pierces the plates 21 and 22 so that the casing 29 is pivotally related to the plates. Passing through the other end of the casing 29 is a bolt 32 having a head 33 for confining a clevis 34. The clevis encompasses the tongue 36 of the drawn vehicle 13 and is constrained therewith by a pivot pin 37. The bolt 32 is capable of extended axial movement with respect to the casing 29 and in order to render such movement or mutation responsive to the amount of draw bar pull exerted by the tractor 5 on the other vehicle 13 I install a coil spring 38 within the casing 29. One end of the spring abuts the end of the casing and the other end of the spring is in abutment with a rack 41 encompassing the rod 32 and held thereon by a nut 42. The spring 38 is preferably of such character that a maximum draft load on the tractor 5 by such means as the vehicle 13 causes the rod 32 to be translated within the casing 29 a maximum amount thereby compressing the spring 38 as much as possible and on the other hand is such that no load upon the braw bar 12 causes the spring 38 to be expanded to the greatest extent. With intermediate loads on the draw bar the compression of the spring 38 is an intermediate and proportionate amount.

In order to take advantage of the change in condition of the draw bar 12 in accordance with the load placed thereupon or in accordance with the draw bar pull transmitted thereby, I preferably utilize the movement of the rack 41 in an axial direction within the casing 29 to effect movement of the control lever 9. To this end on the casing 29 I provide a pair of upstanding ears 43 and 44 which at their upper ends carry a pin 46. On the pin is pivotally mounted a sector 47 having teeth 48 meshing with the teeth 49 of the rack 41. Movement of the rack in an axial direction is therefore effective to rotate the sector 47 about the shaft 46. Forming part of the sector 47 is a forked arm 51 upon which is pivotally mounted a collar 52. The vertical axis of the collar 52 is substantially in alignment with the pivotal axis of the pivot pin 31 so that rotational oscillation of the draw bar 12 in a generally horizontal plane about the pin 31 also rotates the forked arm 51 of the sector about the aligned axis of the collar 52.

Engaged with the collar 52 and constrained against axial movement with respect thereto but freely rotatable therein is a rod 53 extending to a universal joint 54 mounted on a bell crank 56. Also connected to one of the arms 57 of the bell crank is a link 58 to which a rod 59 is joined. The rod 59 is carried in a guide 61 secured to the tractor body and enters a housing 62 within which is a link connection 63 joined to the lever 9.

As the clevis 34 approaches and recedes from the casing 29 the spring 38 is more or less compressed, the sector is oscillated and, through the train of linkage described, the lever 9 is moved in direct proportion thereto thus varying the ratio of transmission of power from the source of power 6 to the ground engaging member 7 in accordance with the mutation or change in condition of the draw bar 12 due to the magnitude of the load placed upon it by the drawn vehicle 13.

Figure 5:
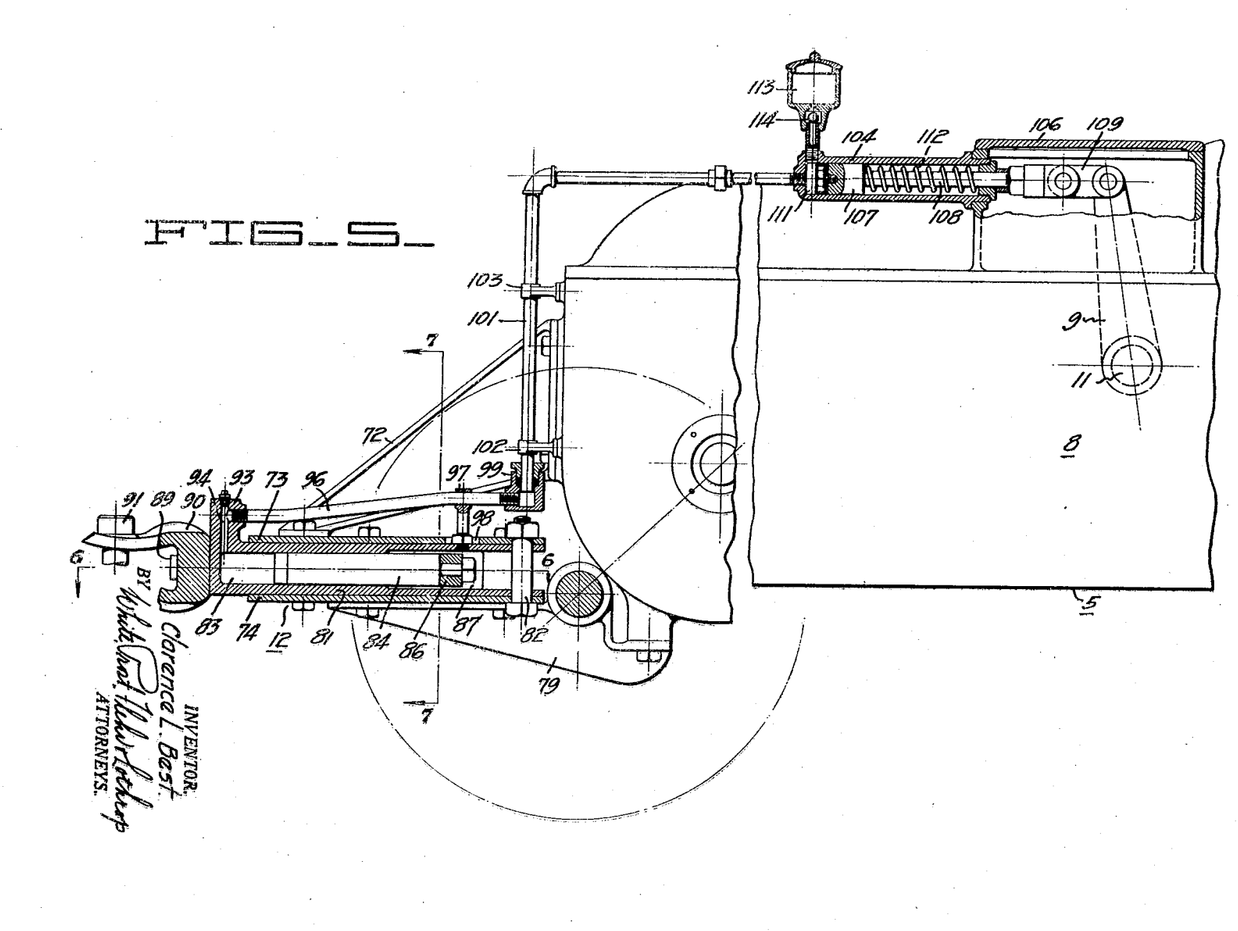
Fig. 5 is a view, similar to Fig. 2, showing a modified form of control of my invention installed on the tractor.
Figure 6:
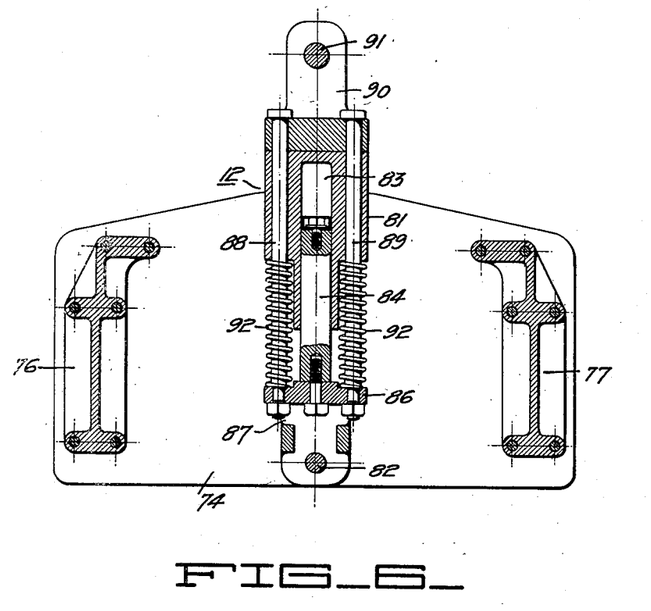
Fig. 6 is a cross section on the line 6—6 of Fig. 5.
Figure 7:
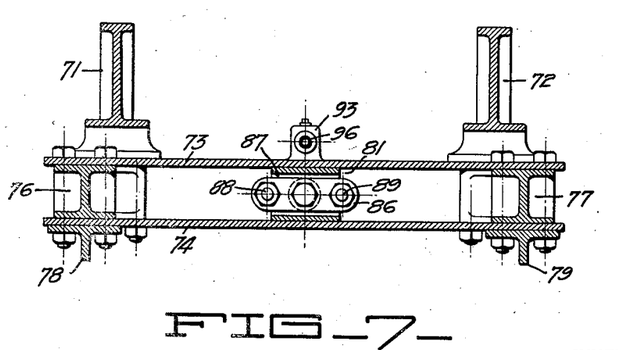
Fig. 7 is a cross section on the line 7—7 of Fig. 5.

In Figs. 5, 6 and 7 I show a modified form of the tractor control of my invention employing a hydraulic mechanism for transmitting mutation of the draw bar 12 to the control lever 9 on the tractor 5. In this instance the tractor is provided with a pair of brackets 71 and 72 carrying an upper plate 73. Parallel to the plate 73 and spaced therefrom is a lower plate 74 held to the upper plate by spacers 76 and 77 and also supported by brackets 78 and 79 secured to the tractor 5. Interposed between the plates 73 and 74 is a casing 81 at its forward end pierced to receive a pivot bolt 82 which also passes through the plates 73 and 74. The casing 81 is thus free to pivot within limits about the bolt 82.

The interior of the casing 81 is bored to provide a chamber 83 within which a piston 84 is reciprocable. Connected to the forward end of the piston is a cross head 86 passing through apertures 87 in the casing 81. To the cross head 86 are connected rods 88 and 89 passing through the rearward portion of the casing 81 and holding at their extremities a clevis 90 provided with a pin 91 for connection to the tongue 36 of the drawn vehicle 13. Encompassing each of the rods 88 and 89 and interposed between the casing 81 and the cross head 86 is a coiled spring 92. With this arrangement, as the clevis 90 is withdrawn from the casing 81 the springs 92 are compressed and the piston 84 enters farther into the chamber 83. Thus, with an increase in draw bar pull of the tractor 5 on the drawn vehicle 13 the volume of chamber 83 is decreased and with a decrease in the draw bar pull the volume of chamber 83 is increased so that the volume of the chamber is proportionate to the draw bar pull.

In order to take advantage of the variation in volume of the chamber 83 I provide the casing 81 with an extension 93 which is drilled to provide a passage 94 for liquid. Communicating with the passage 94 is a tube 96 supported by an eye 97 mounted on the casing 81 and movable therewith through a slot 98 in the upper plate 73. At the forward extremity of the tube 96 I provide a swivel connection 99 with a vertical pipe 101 mounted by brackets 102 and 103 on the tractor 5. The swivel connection 99 is substantially in alignment with the bolt 82 so that horizontal polar movement of the draw bar 12 produces rotation of the swivel connection 99 about the stationary pipe 101.

Connected to the pipe 101 is a casing 104 mounted on an extension 106 of the tractor body. Reciprocable within the casing 104 is a piston 107 connected by a rod 108 and a link 109 to the lever 9 for controlling the variable transmission mechanism interposed between the source of power 6 and the ground engaging member 7 of the tractor. The piston 107 is normally kept in such position that the volume of chamber 111 is a minimum by a spring 112. Opening into chamber 111 is a liquid reservoir 113 communication of which with the chamber is unobstructed when the pressures obtaining in them are substantially equal but is obstructed by a check valve 114 when the pressure in chamber 111 exceeds the pressure in the reservoir 113.

By virtue of the liquid connection between the chamber 83 and the chamber 111 movement of the piston 84 is productive of a directly responsive and proportionate movement of the piston 107. Movement of the piston 107 to enlarge the chamber 111 entails a corresponding movement of the lever 9 so that mutation of the draw bar 12 in response to variations in loads imposed upon it or stress transmitted by it to the draft vehicle 13 is directly translated into movement of the ratio varying mechanism controlled by the lever 9. Return movement is accomplished by the spring 112 driving the piston 107 toward the end of chamber 111 and returning hydraulic fluid to the chamber 83. The supply of liquid to the system is maintained by the reservoir 113. With this structure as with the structures shown in Figs. 1 to 4, inclusive, variation in condition of the draw bar 12 is effective to vary the condition of the power transmitting mechanism interposed between the source of power and the ground engaging means.

Figure 8:
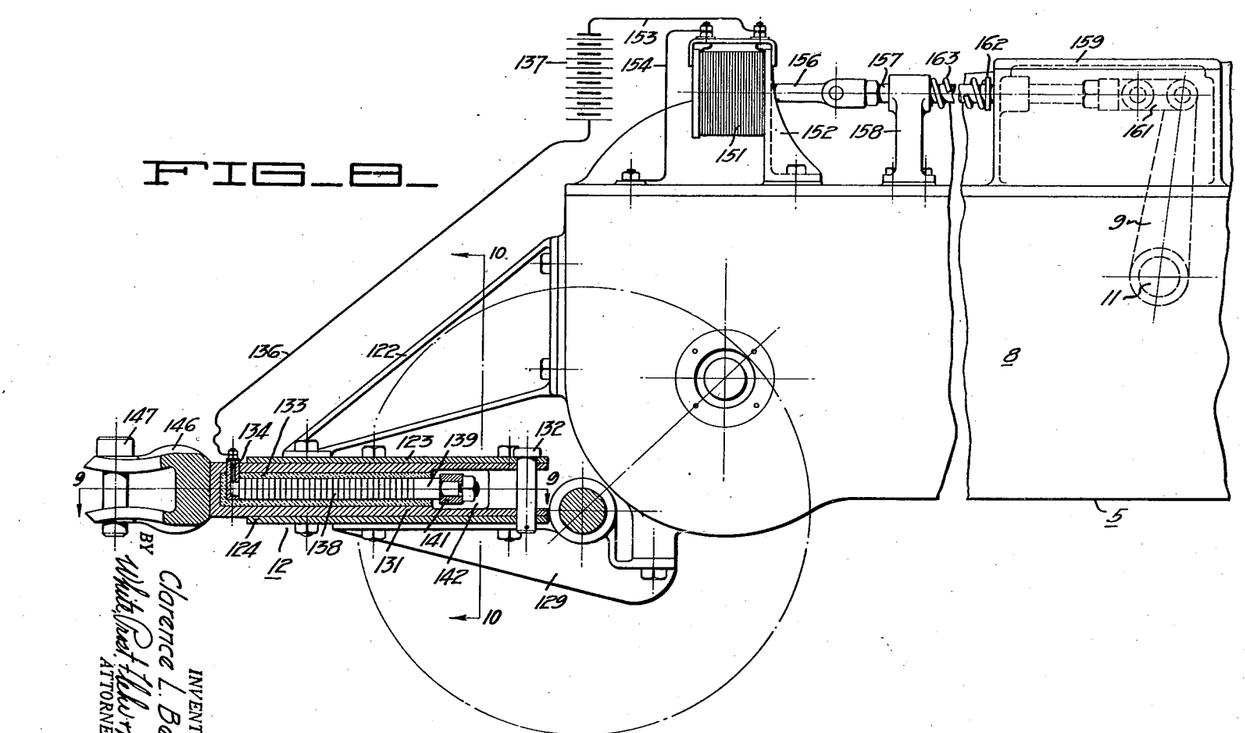
Fig. 8 is a side elevation, similar to Figs. 2 and 5, disclosing a different form of tractor control of my invention.
Figure 9:
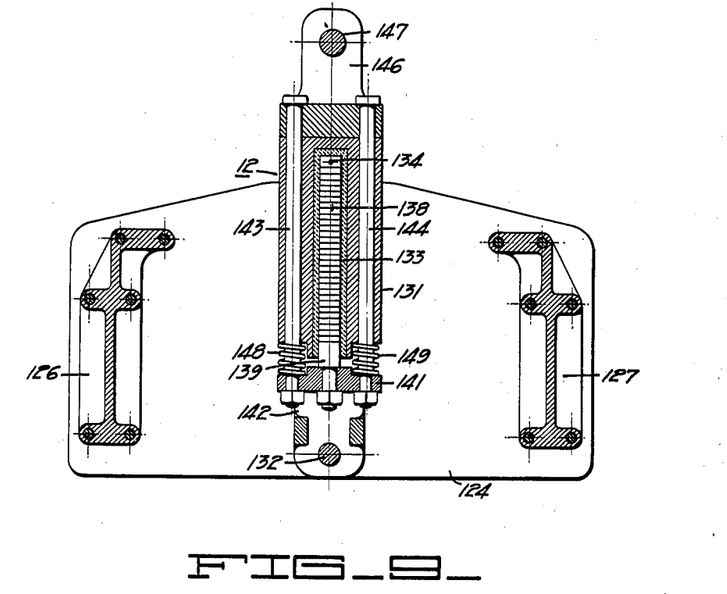
Fig. 9 is a cross section on the line 9—9 of Fig. 8.
Figure 10:
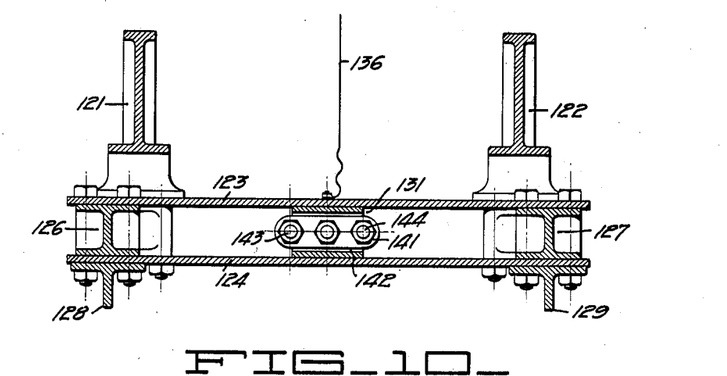
Fig. 10 is a cross section on the line 10—10 of Fig. 8.

In Figs. 8, 9 and 10, I have shown a further modification of my tractor control mechanism. In this modification, on the rearward end of the tractor 5, which is provided with a controller 9 for ratio varying mechanism interposed between the source of power and the ground engaging member, I mount a pair of brackets 121 and 122. These brackets are connected to an upper plate 123 in parallelism with which a plate 124 is mounted. Spacers 126 and 127 are interposed between the plates 123 and 124 while brackets 128 and 129 are connected to the tractor and to the plate 124. Disposed between the plates 123 and 124 is a casing 131 held in place by a pivot pin 132 passing through the plates 123 and 124 and permitting limited angular movement of the casing 131 with respect to the tractor body. The casing 131 is hollow and is internally lined with an insulating bushing 133 of any suitable material. Piercing the casing 131 and the bushing 133 is an insulated metal electrode 134 connected by a wire 136 with a source of electro-motive force such as a battery 137.

Disposed within the bushing 133 and abutting the electrode 134 is a plurality of carbon discs 138 forming a suitable variable electrical resistance. Inserted within the cylindrical bushing 133 to operate against the series of carbon discs 138 is a conducting plug 139 carried on a cross head 141 passing through apertures 142 in the casing 131. The plug 139 is movable into and out of the bushing 133 to compress or release the carbon discs 138. Connected to the cross head 141 are rods 143 and 144 which pass through the casing 131 and terminate exteriorly of a clevis 146 provided with a pin 147 for attachment to the draft vehicle tongue 36. Interposed between the casing 131 and the cross head 141 and encompassing the rods 143 and 144 are coil springs 148 and 149. Mutation or movement of the draft hitch 12 is effective to insert the plug 139 into or withdraw it from the bushing 133. This movement of the plug is in proportion to the bias of springs 148 and 149 and is therefore in direct proportion to the pull exerted by the draw bar 12. Correspondingly, the carbon discs 138 are compressed or released in direct proportion to the drawbar pull and their electrical resistance is thereby varied in direct proportion to the drawbar pull.

In order to utilize the variation in electrical resistance of the series of carbon discs I mount on the tractor 5 a solenoid coil 151 which is supported by a bracket 152. A lead wire 153 conducts current from the battery 137 to the solenoid coil 151 while a lead 154 is grounded on the tractor for a return circuit to the carbon discs through the grounded plug 139. Coactively disposed with respect to the solenoid coil 151 is a solenoid core 156 mounted on a rod 157 which is constrained in a bracket 158 mounted on the tractor 5. The rod 157 passes into a housing 159 enclosing the lever 9 and is connected thereto by a link 161. Interposed between the bracket 158 and a washer 162 fast on the rod 157 is a coil spring 163 for biasing the rod 157 so that the solenoid core 156 is urged out of the coil 151.

In the operation of this device, the variation in electrical resistance of the carbon discs 138 in response to a variation in draw bar pull of the tractor 5 on the draft vehicle 13 is effective to vary the electrical current in the circuit including the solenoid coil 151 so that the core 156 of the solenoid is attracted to the coil in direct proportion to the draw bar pull and is effective to rotate the lever 9 in accordance with the draw bar pull. Return movement of the core 156 is by virtue of spring 163 and is accompanied by rotation of the lever 9 in the proper sense. With this modification, any variation or mutation or change in condition of the draw bar 12 is effective to vary through the lever 9 the ratio of power transmission from the source of power on the tractor to the ground engaging member.

In all of the modifications of my invention described herein there is shown a draft vehicle having a source of power and a ground engaging member connected to the source of power through a variable power transmitting means and there is likewise disclosed a draw bar of such character that as the draw bar pull varies there is transmitted to the power transmission mechanism an impulse of such character that the ratio of power transmission is established at any predetermined value in accordance with the draw bar pull. In the foregoing description and in the claims where I have referred to "draw" bar and "drawn" vehicles I mean to include vehicles which are pushed as well as pulled as the problems involved are identical, the sole difference being one of direction. In addition, while I have shown the embodiments of my invention in conjunction with two separate vehicles, the same mechanism can be used in the same fashion between two relatively movable parts of the same vehicle where it is desired to transmit driving force from one of the parts to the other.

It is to be understood that I do not limit myself to the form of the tractor control shown and described herein, as my invention, as set forth in the following claims may be embodied in a plurality of forms.

I claim:

1. The combination with a motor vehicle having a variable ratio power transmission between the source of power and the traction devices, of a swingable drawbar comprising, two aligned parts resiliently connected together, the first part having a draft connection, and the second part having a pivot connection with said motor vehicle, and an operative connection between said first part of said drawbar and said transmission to enable said drawbar in any position to control said transmission.

2. The combination with a motor vehicle having a source of power, traction devices, a transmission to transmit power from said source of power to said traction devices, and means to vary the ratio of said transmission, of a drawbar comprising two resiliently connected aligned parts, the first part having a draft connection, the second part having a swinging connection with said motor vehicle, and an operative connection between said first part of said drawbar and said transmission ratio varying means.

3. The combination with a motor vehicle having a source of power, traction devices, a transmission to transmit power from said source of power to said traction devices, and means to vary the ratio of said transmission, of a drawbar comprising two resiliently connected aligned parts, the first part having a draft connection, the second part having a swinging connection with said motor vehicle, and an operative connection between said first part of said drawbar and said transmission ratio varying means, including a first element connected to said first drawbar part, and a second element on said second drawbar part operatively connected to said first element.

4. The combination with a motor vehicle having a source of power, traction devices, a transmission to transmit power from said source of power to said traction devices, and means to vary the ratio of said transmission, of a drawbar comprising two resiliently connected aligned parts, the first part having a draft connection, the second part having a swinging connection with said motor vehicle, and an operative connection between said first part of said drawbar and said transmission ratio varying means, including a rack on said first drawbar part, and a segment on said second drawbar part engaging said rack.

5. The combination with a tractor having a motor, traction devices, a transmission to transmit power from said motor to said devices, and means to control the ratio of said transmission, of a drawbar comprising two parts, the first drawbar part being slidable in the second drawbar part, a pivot between the second drawbar part and said tractor, a spring between said parts, a rack on said first drawbar part, a segment on said second drawbar part engaging said rack, a shaft on said tractor in substantial alignment with said pivot, an operative connection between said shaft and said segment, and an operative connection between said shaft and said transmission ratio controlling means.

6. The combination with a motor vehicle having a movable control member, of a drawbar comprising two parts resiliently connected together, the first part having a draft connection and being movable relative to the second part, means for connecting the second part to the vehicle for swinging movement relative thereto, actuating means directly responsive to all relative movement between said parts for moving the control member continually in accordance with said relative movement, and means for rendering said latter means inoperative to move the control member by said swinging movement.

7. The combination with a motor vehicle having a movable control member, of a drawbar comprising two parts resiliently connected together, the first part having a draft connection and being slidable relative to the second part, means for pivotally connecting the second part to the vehicle for movement substantially in a single plane, actuating means directly responsive to all relative movement between said parts for moving the control member continually in accordance with said relative movement, and means for rendering said latter means inoperative to move the control member by pivotal movement of said second part.

8. The combination with a motor vehicle having a movable control member, of a drawbar comprising two parts resiliently connected together, the first part having a draft connection and being movable relative to the second part, means for connecting the second part to the vehicle for pivotal movement relative thereto, means including fluid actuated means operable by relative movement between said parts for moving the control member, and means for rendering said latter means operable in any position of the drawbar.

9. The combination with a motor vehicle having a movable control member, of a drawbar comprising two parts resiliently connected together, the first part having a draft connection and being movable relative to the second part, means for connecting the second part to the vehicle for pivotal movement relative thereto, means including electrically actuated means operable by relative movement between said parts for moving the control member, and means for rendering said latter means operable in any position of the drawbar.

10. The combination with a motor vehicle having a movable control member, of a drawbar comprising two parts resiliently connected together, the first part having a draft connection and being movable relative to the second part, means for connecting the second part to the vehicle for pivotal movement relative thereto, solely mechanical means including a solid connection between said drawbar and said control member operable by relative movement between said parts for moving the control member continually in accordance with said relative movement, and means for rendering said latter means operable in any position of the drawbar.

11. The combination with a motor vehicle having a movable control member, of a drawbar member adapted for connection to a load, means for connecting said drawbar member for both swinging and reciprocal movement, and control member actuating means between said drawbar member and said control member for transmitting all and only reciprocal movement of said drawbar member to said control member to cause said control member to move continually in accordance with movement of said drawbar member.

12. The combination with a motor vehicle having a movable control member, of a drawbar adapted for connection to a load and having a member movable responsive to said load, means for connecting said drawbar to said vehicle for swinging movement relative thereto, and means connected between said movable drawbar member and said movable control member for actuating said movable control member continually in accordance with movement of said movable drawbar member and directly responsive to movement of said movable drawbar member in any position of said drawbar.

13. The combination with a motor vehicle having a movable control member, of a drawbar adapted for connection to a load and having a member movable responsive to said load, means for connecting said drawbar to said vehicle for swinging movement relative thereto, and connecting means between said movable drawbar member and said movable control member for effecting movement of said movable control member continually for all degrees of movement of said movable drawbar member and for actuating said movable control member in any position of said drawbar.

14. The combination with a motor vehicle having a movable control member, of a swinging connection adapted for attachment to a load and including a movable drawbar member capable of assuming a plurality of swung positions, means for mounting said movable drawbar member for said swinging motion, and a connection between said movable drawbar member and said movable control member operable to actuate said control member continually for all degrees of movement of said movable drawbar member and to the same extent in any swung position of said drawbar for a given load.

15. The combination with a motor vehicle having a movable control member, of a swinging connection adapted for attachment to a load and including a movable drawbar member capable of assuming a plurality of swung positions, means for mounting said movable drawbar member for said swinging motion, and a connection between said movable drawbar member and said movable control member operable to effect movement of said movable control member continually for all degrees of movement of said movable drawbar member and to actuate said control member to the same extent in any swung position of said drawbar for a given load.

16. The combination with a motor vehicle having a movable control member, of a drawbar adapted for connection to a load and having a member movable responsive to said load, means for pivotally connecting said drawbar to said vehicle, control member actuating means connected between said movable drawbar member and said control member, and means included in said actuating means and having a pivot in the same axis as the drawbar pivot for preventing movement of said control member by pivotal movement of said drawbar.

17. The combination with a motor vehicle having a movable control member, of a drawbar adapted for connection to a load and having a member movable responsive to said load, means for pivotally connecting said drawbar to said vehicle, control member actuating means connected between said movable drawbar member and said control member capable of moving the control member continually for all degrees of movement of said movable drawbar member, and means included in said actuating means for preventing movement of said control member by pivotal movement of said drawbar.

18. The combination with a motor vehicle having a movable control member, of a drawbar comprising two parts resiliently connected together, the first part having a draft connection and being movable relative to the second part, means for connecting the second part to the vehicle for swinging movement relative thereto, control member actuating means connected between the control member and said first part capable of moving the control member continually for all degrees of movement of said movable drawbar member, and means included in said actuating means for preventing movement of said control member by swinging movement of said drawbar.

19. The combination with a motor vehicle having a movable control member, of a drawbar comprising two parts resiliently connected together, the first part having a draft connection and being movable relative to the second part, means for pivotally connecting the second part to the vehicle for swinging movement about a fixed axis, and control member actuating means connected between the control member and said first part, said actuating means having a pivotal connection positioned in said fixed axis.

20. The combination with a motor vehicle having a movable control member, of a swinging connection adapted for attachment to a load and including a movable drawbar member capable of assuming a plurality of swung positions, means for mounting said movable drawbar member for said swinging motion, means actuated by any movement of said movable drawbar member to effect a corresponding movement of said control member so that the control member moves whenever said movable drawbar member moves, and means causing movement of said movable control member to be unaffected by swinging movement of said drawbar.

CLARENCE LEO BEST.